United States Patent [19]
Goldberg et al.

[11] Patent Number: 6,044,276
[45] Date of Patent: Mar. 28, 2000

[54] METHOD AND APPARATUS IN A MESSAGING SYSTEM FOR LIMITING AN INTERVAL OF CARRIER CANCELLATION

[75] Inventors: Steven Jeffrey Goldberg, Fort Worth; Brian Joseph Budnik, Watauga; Thomas Aloysius Sexton; Stephen Rocco Carsello, both of Fort Worth, all of Tex.

[73] Assignee: Motorola, Inc., Schaumburg, Ill.

[21] Appl. No.: 08/959,409

[22] Filed: Oct. 28, 1997

[51] Int. Cl.[7] .................................................. H04B 7/005
[52] U.S. Cl. .......................... 455/503; 455/504; 455/60; 455/67.1
[58] Field of Search .................................. 455/38.1, 38.3, 455/502, 503, 501, 60, 69, 63, 67.4, 67.6, 504; 340/825.44

[56] References Cited

U.S. PATENT DOCUMENTS

| | | | |
|---|---|---|---|
| 4,570,265 | 2/1986 | Thro | 455/52 |
| 5,218,717 | 6/1993 | Reitberger | 455/67.6 |
| 5,381,447 | 1/1995 | Ayerst et al. | 375/1 |
| 5,710,546 | 1/1998 | Leitch | 340/825.44 |

*Primary Examiner*—Daniel S. Hunter
*Assistant Examiner*—Darnell R. Armstrong
*Attorney, Agent, or Firm*—R. Louis Breeden

[57] ABSTRACT

In a messaging system having a plurality of simulcasting base transmitters (104), a plurality of pseudorandom sequence generators (216) are provided (402) for the plurality of base transmitters. The plurality of pseudorandom sequence generators are arranged (403) to ensure that they generate a plurality of pseudorandom sequences having sub-sequences that are different from one another during concurrent transmissions by the plurality of base transmitters. A cancellation-affecting parameter of the plurality of base transmitters is adjusted (404, 406, 408) in accordance with the plurality of pseudorandom sequences during the simulcast transmission from the plurality of base transmitters to limit intervals of carrier cancellation.

21 Claims, 3 Drawing Sheets

6,044,276

METHOD AND APPARATUS IN A MESSAGING SYSTEM FOR LIMITING AN INTERVAL OF CARRIER CANCELLATION

FIELD OF THE INVENTION

This invention relates in general to radio communication systems, and more specifically to a method and apparatus in a messaging system for limiting an interval of carrier cancellation.

BACKGROUND OF THE INVENTION

Radio messaging systems have utilized simulcast transmissions from multiple transmitters for providing radio coverage to large geographic areas. During a simulcast transmission a receiver positioned midway between two transmitters often can receive signals from both transmitters. The resultant instantaneous sum of the two signals depends upon their relative phase, and can be either larger or smaller than either signal alone. For example, if the two signals are substantially equal in amplitude and phase at the receiver, their resultant sum will be about twice the amplitude of either signal alone. If, however, the two signals are substantially equal in amplitude and 180 degrees out of phase, their resultant sum can be so small as to be undetectable by the receiver, due to destructive cancellation of the two signals.

Modern messaging systems utilize forward error correcting codes and bit interleaving to allow messages to be transmitted successfully in the presence of brief fades and noise bursts. Thus, an error-free message can be received even in the presence of intervals of destructive cancellation, provided that the intervals of destructive cancellation are sufficiently brief. To ensure that the intervals of destructive cancellation are sufficiently brief, the prior art messaging systems have employed a technique of permanently offsetting the carrier frequencies of adjacent transmitters with respect to one another by a small, fixed amount, e.g., 15 to 100 Hz.

A problem with the technique of permanently offsetting the carrier frequencies of adjacent transmitters is that it requires additional system planning and effort in setting up the radio messaging system. Furthermore, the technique can cause difficulties when adding new transmitters to an existing system, because the frequency offsets of many of the existing transmitters may have to be readjusted. In addition, some specific frequency offsets between adjacent transmitters, e.g., 200 Hz, are known to cause a higher word error rate, and should be avoided.

Thus, what is needed is a method and apparatus for limiting the intervals of destructive cancellation during simulcast transmissions. The method and apparatus preferably will limit the intervals of destructive cancellation without utilizing the prior art technique of permanently offsetting the carrier frequencies of adjacent transmitters with respect to one another.

SUMMARY OF THE INVENTION

An aspect of the present invention is a method in a messaging system having a plurality of base transmitters, the method for limiting an interval of carrier cancellation at a reception point during a simulcast transmission. The method comprises the step of providing a plurality of pseudorandom sequence generators for the plurality of base transmitters, the plurality of pseudorandom sequence generators arranged to ensure that they generate a plurality of pseudorandom sequences having subsequences that are different from one another during concurrent transmissions by the plurality of base transmitters. The method further comprises the step of adjusting a cancellation-affecting parameter of the plurality of base transmitters in accordance with the plurality of pseudorandom sequences during the simulcast transmission from the plurality of base transmitters.

Another aspect of the present invention is a base transmitter in a messaging system having a plurality of base transmitters, the base transmitter for limiting an interval of carrier cancellation at a reception point during a simulcast transmission. The base transmitter comprises a transmitter element for transmitting a message, and a processing system coupled to the transmitter element for controlling the transmitter element to transmit the message. The base transmitter further comprises an input interface coupled to the processing system for receiving the message; and a pseudorandom sequence generator coupled to the transmitter element, the pseudorandom sequence generator arranged to ensure that it generates a pseudorandom sequence having sub-sequences that are different from those generated in other ones of the plurality of base transmitters during concurrent transmissions by the plurality of base transmitters. The transmitter element is arranged such that the pseudorandom sequence generator adjusts a cancellation-affecting parameter of the transmitter element in accordance with the pseudorandom sequence during the simulcast transmission from the base transmitter.

A third aspect of the present invention is a method in a messaging system having a plurality of base transmitters, the method for limiting an interval of carrier cancellation at a reception point during a simulcast transmission. The method comprises the step of providing a plurality of pseudorandom sequence generators for the plurality of base transmitters, the plurality of pseudorandom sequence generators arranged to generate a plurality of pseudorandom sequences having sub-sequences that have more than a predetermined probability of being different from one another during concurrent transmissions by the plurality of base transmitters. A parameter of the plurality of pseudorandom sequences is optimized according to a characteristic of a communication protocol utilized by the messaging system. The method further comprises the step of adjusting a cancellation-affecting parameter of the plurality of base transmitters in accordance with the plurality of pseudorandom sequences during the simulcast transmission from the plurality of base transmitters.

DETAILED DESCRIPTION OF THE DRAWINGS

Figure 1:
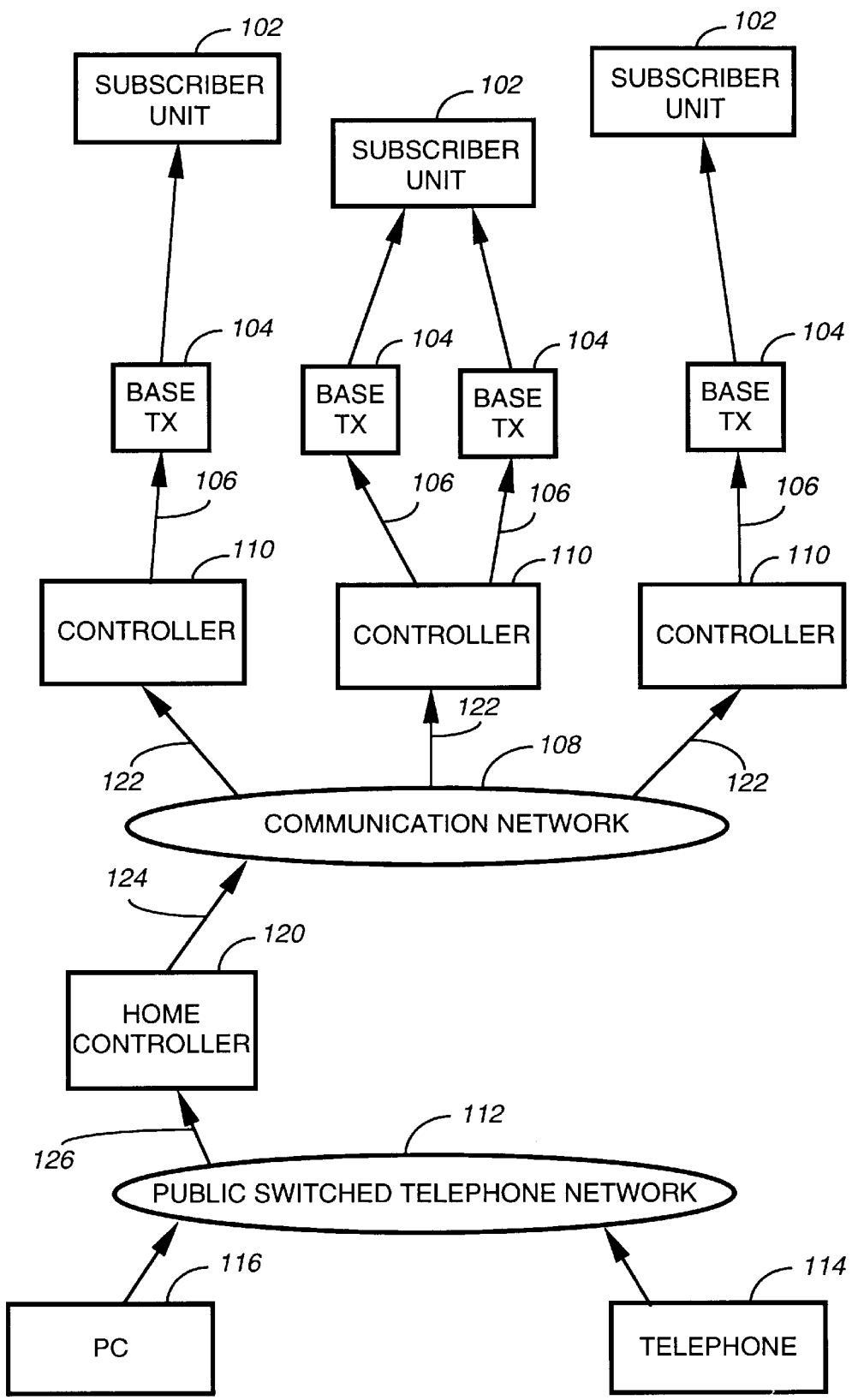
FIG. 1 is an electrical block diagram of a messaging system in accordance with the present invention.

Referring to FIG. 1, an electrical block diagram of a messaging system in accordance with the present invention comprises a plurality of subscriber units 102, which communicate by radio with a fixed portion of the radio system, comprising a plurality of base transmitters 104 and a plurality of controllers 110. The base transmitters 104 are coupled via communication links 106 to the plurality of controllers 110 for control by and communication with the plurality of controllers 110 utilizing well-known techniques. The controllers 110 are coupled to a home controller 120 via communication links 122, 124, and via a conventional communication network 108 for receiving selective call messages from the home controller 120. The home controller 120 and the controllers 110 preferably communicate by utilizing a well-known protocol, e.g., the Telocator Network Paging Protocol (TNPP), the Wireless Messaging transfer protocol (WMtp™), or the InterPaging Networking Protocol (IPNP). It will be appreciated that, alternatively, the home controller 120 and the controller 110 can be collocated. The home controller 120 is preferably coupled via telephone links 126 to a public switched telephone network 112 (PSTN) for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controller 120. The hardware of the home controller 120 is preferably similar to the Wireless Messaging Gateway (WMG™) Administrator! paging terminal, while the hardware of the controllers 110 is preferably similar to that of the RF-Conductor!™ message distributor, both manufactured by Motorola, Inc. of Schaumburg, Ill. The hardware of the base transmitters 104 is preferably similar to that of the Nucleus® and RF-Orchestra!® transmitters manufactured by Motorola, Inc. It will be appreciated that other similar hardware can be utilized as well for the home controller 120, the controllers 110, and the base transmitters 104. It will be further appreciated that the present invention can be applied to both one-way and two-way selective call messaging systems.

The protocol utilized for transmitting the messages between the base transmitters 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other similar messaging protocols can be used as well.

Figure 2:
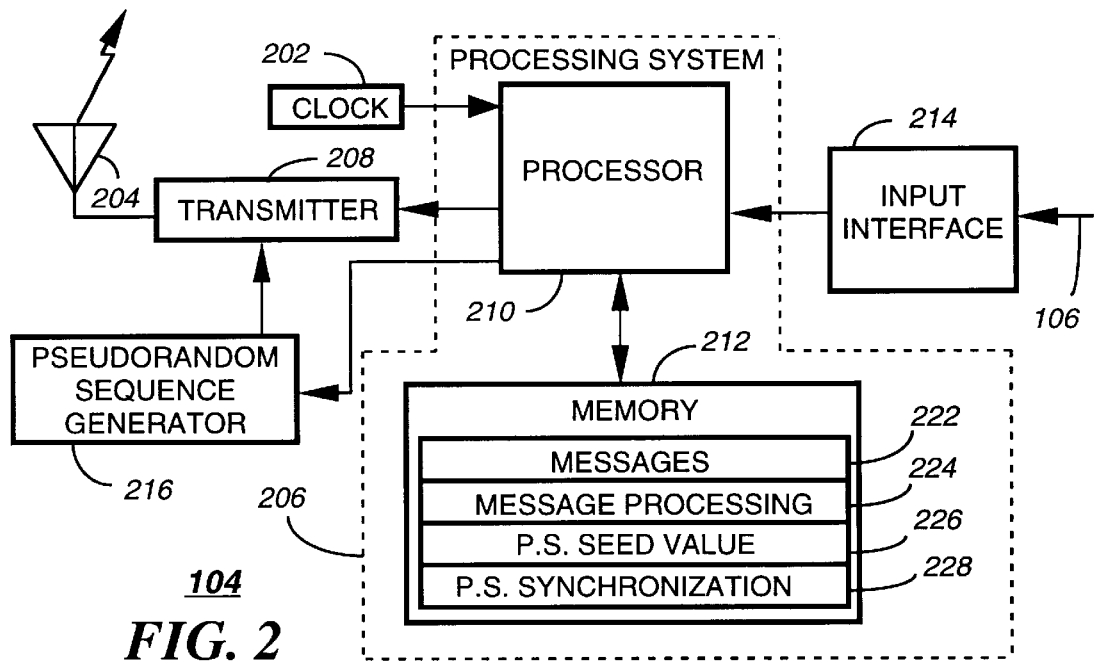
FIG. 2 is an electrical block diagram of an exemplary inplementation of a base transmitter in accordance with the present invention.

Referring to FIG. 2, an electrical block diagram depicts an exemplary inplementation of the base transmitter 104 in accordance with the present invention. The base transmitter 104 comprises an antenna 204 for emitting a radio signal comprising a message. The base transmitter 104 further comprises a conventional transmitter element 208 coupled to the antenna 204 for transmitting the message, and a processing system 206 coupled to the transmitter element 208 for controlling the transmitter element 208 to transmit the message. The processing system is further coupled to a conventional pseudorandom sequence generator 216, which is also coupled to the transmitter element 208. The pseudorandom sequence generator 216 is arranged to ensure that it generates a pseudorandom sequence having sub-sequences that are different from those generated in other ones of the plurality of base transmitters during concurrent transmissions by the plurality of base transmitters, as described further below. Preferably, the pseudorandom sequence generator 216 is further arranged to provide a pseudorandom sequence identical to that of other base transmitters of the plurality of base transmitters, but initialized, concurrently with the other base transmitters, with a seed value different from that of the other base transmitters. It will be appreciated that, alternatively, the pseudorandom sequence generator 216 can be arranged to provide a pseudorandom sequence that is different from that of other base transmitters 104 of the plurality of base transmitters by, for example, enabling different feedback taps on the pseudorandom sequence generators 216 associated with different base transmitters 104. In addition, the pseudorandom sequence generator 216 preferably has at least a predetermined minimum number of stages, e.g., 20 stages. This preference facilitates allowing the base transmitters 104 to be concurrently initialized with different seed values 226 derived, for example, from the serial number of the base transmitters 104. It also will be appreciated that, alternatively, the pseudorandom sequence generator 216 can be incorporated into the processing system 206, where its functions can be performed in software.

The transmitter element 208 is arranged such that the pseudorandom sequence generator 216 adjusts a cancellation-affecting parameter of the transmitter element 208 in accordance with the pseudorandom sequence during a simulcast transmission from the base transmitter 104. More specifically, the transmitter element 208 preferably includes a conventional frequency modulator (not shown) coupled to the pseudorandom sequence generator 216 such that the pseudorandom sequence generator 216 adjusts the carrier frequency of the base transmitter 104 in accordance with the pseudorandom sequence. In the simplest case, the pseudorandom sequence generator 216 cooperates with the transmitter element 208 to adjust the carrier frequency of the base transmitter 104 to one of two levels, e.g., ±50 Hz, about a predetermined nominal carrier frequency. It will be appreciated that, alternatively, the pseudorandom sequence generator 216 and the transmitter element 208 can be arranged to adjust the carrier frequency to one of N predetermined levels in accordance with the pseudorandom sequence, N being an integer greater than unity. It will be further appreciated that, alternatively, the transmitter element 208 can be arranged such that another cancellation-affecting parameter of the base transmitter 104, e.g., the carrier phase or the carrier amplitude, is adjusted in accordance with the pseudorandom sequence, through well-known techniques. It also will be appreciated that, alternatively, the transmitter element 208 can be arranged such that the pseudorandom sequence generator 216 adjusts at least two cancellation-affecting parameters selected from a group of cancellation-affecting parameters consisting of the carrier frequency, the carrier phase, and the carrier amplitude. In addition, it will be appreciated that the pseudorandom sequence may have to be filtered to prevent instantaneous shifts of the cancellation-affecting parameter(s).

Preferably, the pseudorandom sequence generator 216 is further arranged to optimize a parameter of the plurality of pseudorandom sequences according to a characteristic of the communication protocol utilized by the messaging system, such that the intervals of destructive cancellation will exist only long enough to potentially destroy, i.e., change the value of, less than a predetermined number of bits, e.g., two bits, of a given (interleaved) code word, which will fall within the error correction capability of the protocol. This essentially moves the bit errors around, distributing them randomly such that the forward error correction is very likely to correct all the errors caused by the intervals of destructive cancellation.

For example, consider the FLEX protocol, which uses (32,21) BCH code words interleaved such that there are 5 ms intervals between bits corresponding to the same code word. Each block of interleaved code words lasts 160 ms. Consider the case of no dithering and no frequency offsets and a 1 Hz frequency error between two adjacent FM transmitters. The interval of destructive cancellation may last on the order of 100 ms, which will destroy most code word bits (exceeding the forward error correction capability) in 1 or 2 interleaved blocks of the transmission, yet leaving another 4 or 5 interleaved blocks error free. In this condition little benefit is derived from the forward error correction. Now consider the use of pseudorandom frequency dithering in accordance with the present invention, e.g., ±50 Hz about a nominal frequency, with the duration of each dither set to 7.5 ms, for example. An interval of destructive cancellation lasting 7.5 ms and repeating no more frequently than every 160 ms will destroy, on average, ¾ bit from each code word. If a random phase difference between two signals generates an interval of destructive cancellation with a probability of 0.1 (as derived further below), then, on average, a destructive phase condition will occur 1.6 times per code word in each block, advantageously allowing a greatly increased benefit from forward error correction coding.

Again referring to FIG. 2, the processing system 206 is further coupled to a conventional clock 202 for generating a timing signal for the base transmitter 104. The accuracy of the timing signal preferably is sufficient to maintain synchronization of the pseudorandom sequence generator 216 within a small time tolerance, e.g., 100 microseconds, between resynchronizations of the pseudorandom sequence generator 216. It will be appreciated that, alternatively, the timing signal can be derived from a Global Positioning Satellite (GPS) receiver. The processing system 206 is also coupled to a conventional input interface 214 for receiving the message via the communication link 106.

The processing system 206 comprises a conventional processor 210 and a conventional memory 212. The memory 212 includes locations for storing messages 222 received through the input interface 214 and, preferably, a pseudorandom sequence seed value 226 derived, for example, from a serial number uniquely assigned by the factory to the base transmitter 104. The memory 212 also includes software elements for message processing 224 and pseudorandom sequence synchronization 228 in accordance with the present invention.

Figure 3:
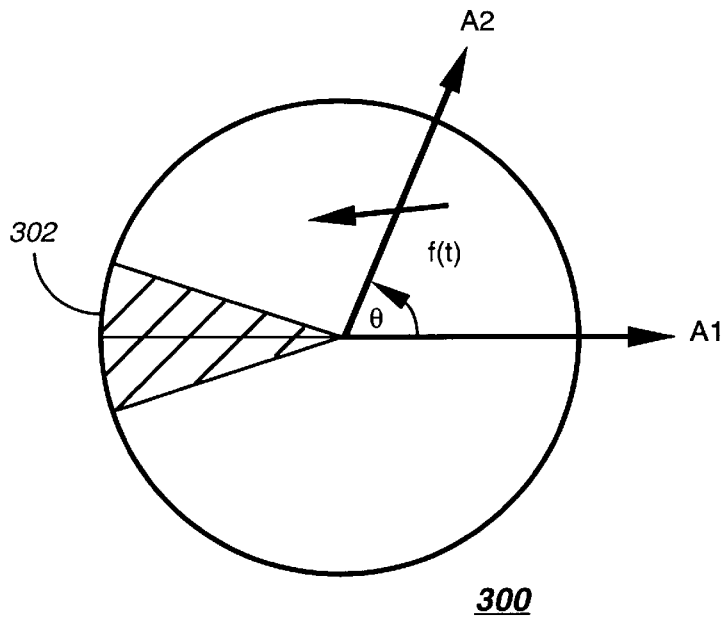
FIG. 3 is a diagram depicting amplitude and relative phase of two carriers offset in frequency in accordance with the present invention.

Referring to FIG. 3, a diagram 300 depicting amplitude (represented by length) and relative phase ($\theta$) of two carriers A1, A2 offset in frequency in accordance with the present invention and received by a receiver at a reception point between two of the base transmitters 104. Assume, for example, that the frequency of the carrier A2 is higher than that of the carrier A1. The result is that the phase of A2 is changing faster with time than that of A1. Periodically, the relative phase $\theta$ at the receiver is such that A2 enters the shaded area defined as the zone of destructive cancellation 302. The zone of destructive cancellation 302 preferably is defined, by way of example, to correspond to $$0.9\pi < \theta < 1.1\pi.$$

As $\theta$ traverses $2\pi$ for each full revolution, one can conclude that for a fixed, nonzero frequency difference between A1 and A2 the probability that A2 is in the zone of destructive cancellation 302 at a randomly chosen instant of time is P=0.1. For a pseudorandomly varied frequency difference between A1 and A2 in accordance with the present invention the probability that A2 is in the zone of destructive cancellation 302 at a randomly chosen instant of time is also P=0.1.

The instantaneous power at the receiver is $$P(t)=(A1+A2 \cos (\theta))^2+(A2 \sin (\theta))^2.$$

If A1=A2=1, the average power is 2.0. At $0.9\pi$ and $1.1\pi$ the instantaneous power is approximately 0.1. Thus, within the defined zone of destructive cancellation 302 the instantaneous power is approximately 13 dB or more below the average power. While there is no way to prevent the two carriers A1 and A2 from entering the zone of destructive cancellation 302, it is highly desirable to minimize their stay in the zone, as is advantageously accomplished in accordance with the present invention, as described further below. It will be appreciated that, alternatively, other exemplary ranges of $\theta$ can be utilized to define the zone of destructive cancellation 302.

Figure 4:
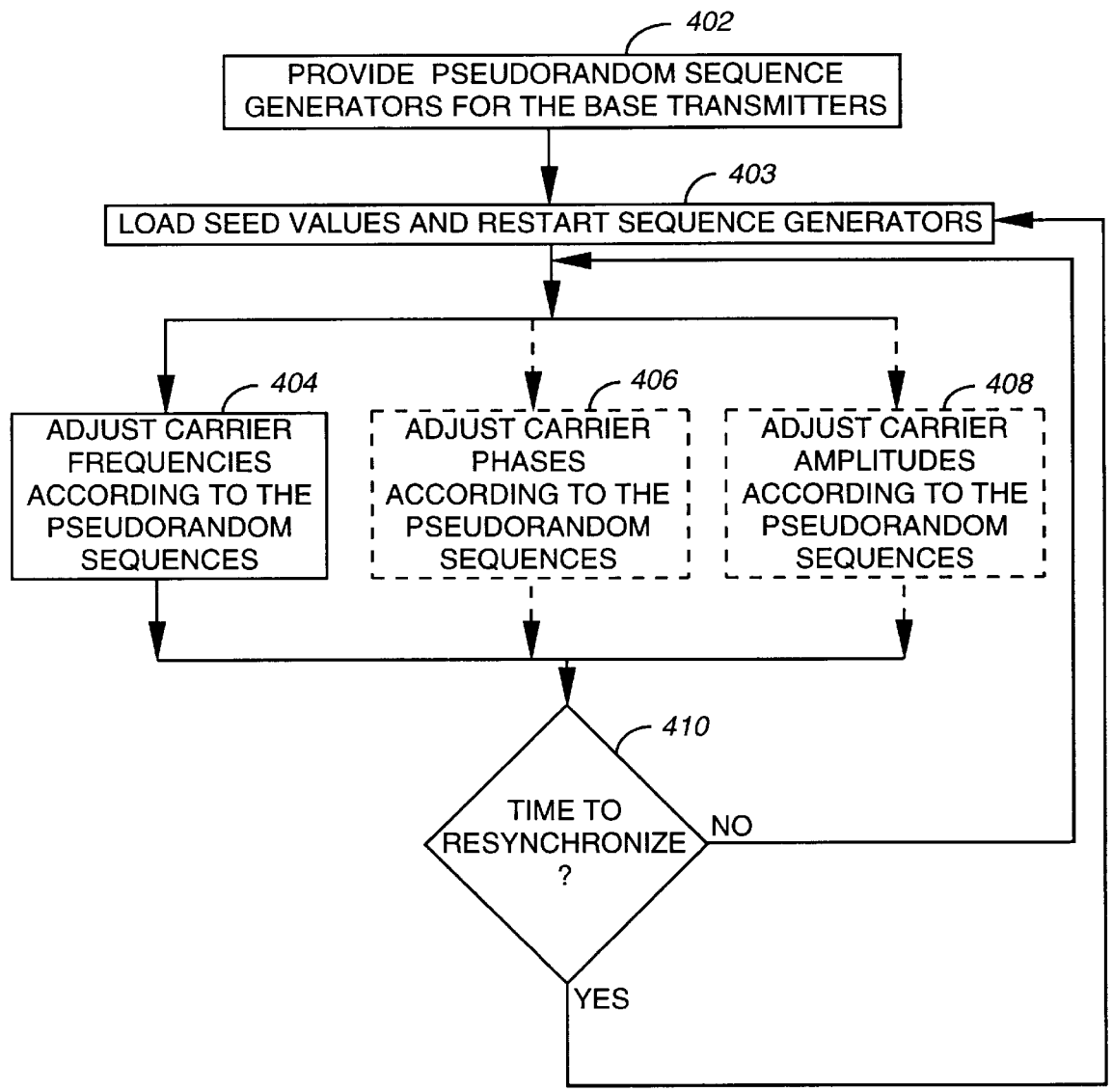
FIG. 4 is a flow chart depicting operation of the messaging system in accordance with the present invention.

FIG. 4 is a flow chart 400 depicting operation of the messaging system in accordance with the present invention. The flow chart 400 begins with providing 402 the pseudorandom sequence generators 216 for the base transmitters 104. After the messaging system is powered up, the processing systems 206 access the seed values 226 corresponding to each of the base transmitters 104. The processing systems 206 then load 403 the seed values 226 and simultaneously restart the pseudorandom sequence generators 216. The restarting of the pseudorandom sequence generators 216 is preferably synchronized by the communication protocol to recur, for example, at the top of each hour. Concurrently restarting the pseudorandom sequence generators 216 periodically in this manner with different seed values 226 advantageously allows identical-sequence pseudorandom sequence generators 216 to be utilized for the base stations, while ensuring that the pseudorandom sequences contain sub-sequences that are different from one another during concurrent transmissions by the base transmitters 104 (due to the sequences being offset from one another by the different seed values 226). It will be appreciated that, alternatively, the pseudorandom sequence generators 216 can comprise different-sequence pseudorandom sequence generators to ensure that the pseudorandom sequences generated thereby are different from one base transmitter 104 to the next.

Next, the processing systems 206 preferably begin adjusting the carrier frequencies 404 of the corresponding transmitter elements 208 according to the pseudorandom sequences. Alternatively, the processing systems 206 can adjust another cancellation-affecting parameter, such as the carrier phases 406 and/or the carrier amplitudes 408 in addition to, or in lieu of, adjusting the carrier frequencies. For the case of frequency or phase adjustment, the processing systems 206 preferably are programmed to ensure a uniformly distributed phase between 0 and $2\pi$. The processing systems 206 also check 410 whether it is time to resynchronize the pseudorandom sequence generators 216. If so, the flow returns to step 403. If not, the flow returns to the appropriate ones of the adjusting steps 404, 406 and 408.

Simulations in accordance with the present invention have demonstrated that by continuously adjusting a cancellation-affecting parameter of the base stations in accordance with the present invention, the intervals of destructive carrier cancellation advantageously are limited in length and are randomly dispersed throughout the interleaved transmission blocks of the communication protocol, thereby substantially reducing the word error rate. The simulations have further demonstrated that no other carrier frequency offsetting technique is needed to meet performance objectives. In addition, by randomizing the starting points of the pseudorandom sequences through the use of seed values derived from a random number source, which can include the base station serial numbers, no additional system planning effort is required for adjusting the base stations relative to one another to limit carrier cancellation.

Thus, it should be clear from the preceding disclosure that the present invention provides a method and apparatus for limiting the intervals of destructive cancellation during simulcast transmissions. The method and apparatus advantageously limits the intervals of destructive cancellation without utilizing the administratively difficult prior art technique of permanently offsetting the carrier frequencies of adjacent transmitters with respect to one another.

Many modifications and variations of the present invention are possible in light of the above teachings. Thus, it is to be understood that, within the scope of the appended claims, the invention can be practiced other than as described herein above for the exemplary embodiments.

What is claimed is:

1. A method in a messaging system having a plurality of base transmitters, the method for limiting an interval of carrier cancellation at a reception point during a simulcast transmission, the method comprising the steps of:

providing a plurality of pseudorandom sequence generators for the plurality of base transmitters, the plurality of pseudorandom sequence generators arranged to ensure that they generate a plurality of pseudorandom sequences having sub-sequences that are different from one another during concurrent transmissions by the plurality of base transmitters;

continuously dithering a parameter selected from at least one of a carrier frequency, a carrier phase, and a carrier amplitude, of the plurality of base transmitters in accordance with the plurality of pseudorandom sequences during the simulcast transmission from the plurality of base transmitters; and prior to the dithering step, further arranging the plurality of pseudorandom sequence generators to adjust a duration of dithers of said parameter to a length selected to limit the interval of carrier cancellation to a predetermined period, thereby allowing an increased benefit from a forward error correction code utilized in the messaging system.

2. The method of claim 1, wherein the dithering step comprises the step of dithering a carrier frequency of the plurality of base transmitters.

3. The method of claim 1, wherein the dithering step comprises the step of dithering a carrier phase of the plurality of base transmitters.

4. The method of claim 1, wherein the dithering step comprises the step of dithering a carrier amplitude of the plurality of base transmitters.

5. The method of claim 1, wherein the dithering step comprises the step of dithering at least two cancellation-affecting parameters selected from a group of cancellation-affecting parameters consisting of the carrier frequency, the carrier phase, and the carrier amplitude.

6. The method of claim 1, wherein the arranging step comprises the step of optimizing the duration of the dithers produced by the plurality of pseudorandom sequences according to a characteristic of a communication protocol utilized by the messaging system.

7. The method of claim 1, wherein the providing step comprises the step of providing a plurality of identical-sequence pseudorandom sequence generators initialized concurrently with different seed values.

8. The method of claim 1, wherein the providing step comprises the step of providing a plurality of different-sequence pseudorandom sequence generators.

9. The method of claim 1, wherein the providing step comprises the step of providing a pseudorandom sequence generator having at least a predetermined minimum number of stages.

10. The method of claim 1,
wherein the dithering step comprises the step of dithering the parameter among N predetermined levels in accordance with the plurality of pseudorandom sequences, N being an integer greater than unity.

11. A base transmitter in a messaging system having a plurality of base transmitters, the base transmitter for limiting an interval of carrier cancellation at a reception point during a simulcast transmission, the base transmitter comprising:

a transmitter element for transmitting a message;

a processing system coupled to the transmitter element for controlling the transmitter element to transmit the message;

an input interface coupled to the processing system for receiving the message; and a pseudorandom sequence generator coupled to the transmitter element, the pseudorandom sequence generator arranged to ensure that it generates a pseudorandom sequence having sub-sequences that are different from those generated in other ones of the plurality of base transmitters during concurrent transmissions by the plurality of base transmitters, wherein the transmitter element is arranged such that the pseudorandom sequence generator continuously dithers a parameter selected from at least one of a carrier frequency, a carrier phase, and a carrier amplitude, of the transmitter element in accordance with the pseudorandom sequence during the simulcast transmission from the base transmitter, and wherein the pseudorandom sequence generator is further arranged to adjust a duration of dithers of said parameter to a length selected to limit the interval of carrier cancellation to a predetermined period, thereby allowing an increased benefit from a forward error correction code utilized in the messaging system.

12. The base transmitter of claim 11, wherein the transmitter element is further arranged such that the pseudorandom sequence generator dithers a carrier frequency of the base transmitter.

13. The base transmitter of claim 11, wherein the transmitter element is further arranged such that the pseudorandom sequence generator dithers a carrier phase of the base transmitter.

14. The base transmitter of claim 11, wherein the transmitter element is further arranged such that the pseudorandom sequence generator dithers a carrier amplitude of the base transmitter.

15. The base transmitter of claim 11, wherein the transmitter element is further arranged such that the pseudorandom sequence generator dithers at least two cancellation-affecting parameters selected from a group of cancellation-affecting parameters consisting of the carrier frequency, the carrier phase, and the carrier amplitude.

16. The base transmitter of claim 11, wherein the pseudorandom sequence generator is further arranged to optimize the duration of the dithers produced by the plurality of pseudorandom sequences according to a characteristic of a communication protocol utilized by the messaging system.

17. The base transmitter of claim 11, wherein the pseudorandom sequence generator is further arranged to provide a pseudorandom sequence identical to that of other base transmitters of the plurality of base transmitters but initialized, concurrently with the other base transmitters, with a seed value different from that of the other base transmitters.

18. The base transmitter of claim 11, wherein the pseudorandom sequence generator is further arranged to provide a pseudorandom sequence that is different from that of other base transmitters of the plurality of base transmitters.

19. The base transmitter of claim 11, wherein the pseudorandom sequence generator has at least a predetermined minimum number of stages.

20. The base transmitter of claim 11,
   wherein the transmitter element is further arranged to dither the parameter among N predetermined levels in accordance with the pseudorandom sequence, N being an integer greater than unity.

21. A method in a messaging system having a plurality of base transmitters, the method for limiting an interval of carrier cancellation at a reception point during a simulcast transmission, the method comprising the steps of:
   providing a plurality of pseudorandom sequence generators for the plurality of base transmitters, the plurality of pseudorandom sequence generators arranged to generate a plurality of pseudorandom sequences having sub-sequences that have more than a predetermined probability of being different from one another during concurrent transmissions by the plurality of base transmitters, wherein a parameter of the plurality of pseudorandom sequences is optimized according to a characteristic of a communication protocol utilized by the messaging system;

continuously dithering a parameter selected from at least one of a carrier frequency, a carrier phase, and a carrier amplitude, of the plurality of base transmitters in accordance with the plurality of pseudorandom sequences during the simulcast transmission from the plurality of base transmitters; and prior to the dithering step, further arranging the plurality of pseudorandom sequence generators to adjust a duration of dithers of said parameter to a length selected to limit the interval of carrier cancellation to a predetermined period, thereby allowing an increased benefit from a forward error correction code utilized in the messaging system.

* * * * *